United States Patent
Maeda et al.

(10) Patent No.: US 11,021,018 B2
(45) Date of Patent: Jun. 1, 2021

(54) TIRE

(71) Applicant: Sumitomo Rubber Industries, Ltd., Kobe (JP)

(72) Inventors: Yoshiyuki Maeda, Kobe (JP); Keita Nakano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 469 days.

(21) Appl. No.: 15/934,073

(22) Filed: Mar. 23, 2018

(65) Prior Publication Data

US 2018/0281528 A1    Oct. 4, 2018

(30) Foreign Application Priority Data

Mar. 30, 2017 (JP) .............................. JP2017-067117

(51) Int. Cl.
*B60C 11/04* (2006.01)
*B60C 11/117* (2006.01)
(Continued)

(52) U.S. Cl.
CPC ............ *B60C 11/04* (2013.01); *B60C 11/032* (2013.01); *B60C 11/0304* (2013.01);
(Continued)

(58) Field of Classification Search
CPC ............... B60C 11/0304; B60C 11/032; B60C 11/1307
See application file for complete search history.

(56) References Cited

U.S. PATENT DOCUMENTS 2,575,439 A * 11/1951 Billingsley ......... B60C 11/0323
152/209.17
3,286,756 A    11/1966 Ellenrieder et al.
(Continued)

FOREIGN PATENT DOCUMENTS

AU          634471 B  *  5/1990
EP        0855292 A1     7/1998
(Continued)

OTHER PUBLICATIONS

Machine translation for Japan 2016-112926 (Year: 2020).*
(Continued)

*Primary Examiner* — Steven D Maki
(74) *Attorney, Agent, or Firm* — Birch, Stewart, Kolasch & Birch, LLP (57) ABSTRACT

A tire includes a tread portion including first to third main grooves continuously extending in a tire circumferential direction. The first main groove has a groove centerline arranged on a side of the inboard tread edge with respect to a tire equator and the groove centerline is located at an axial distance L1 from the tire equator of from 5% to 25% of a tread half width. The second main groove is arranged between the first main groove and the inboard tread edge and has a groove centerline located at an axial distance L2 from the tire equator of from 35% to 65% of the tread half width. The third main groove is arranged between the tire equator and the outboard tread edge and has a groove centerline located at an axial distance L3 from the tire equator of from 25% to 55% of the tread half width.

19 Claims, 7 Drawing Sheets

(51) Int. Cl.
 *B60C 11/03* (2006.01)
 *B60C 11/13* (2006.01)

(52) U.S. Cl.
 CPC ........ *B60C 11/042* (2013.01); *B60C 11/1307* (2013.01); *B60C 2011/0348* (2013.01); *B60C 2011/0353* (2013.01); *B60C 2011/0355* (2013.01); *B60C 2011/0362* (2013.01); *B60C 2011/0365* (2013.01); *B60C 2011/0367* (2013.01); *B60C 2011/0381* (2013.01); *B60C 2011/0383* (2013.01); *B60C 2200/04* (2013.01)

(56) References Cited

U.S. PATENT DOCUMENTS

| | | | |
|---|---|---|---|
| 3,705,613 | A | 12/1972 | Verdier |
| 4,635,694 | A * | 1/1987 | Hosokawa .......... B60C 11/0306 152/209.9 |
| 5,031,680 | A * | 7/1991 | Kajikawa ................ B60C 11/11 152/209.18 |
| 2006/0005904 | A1 * | 1/2006 | Helt .................. B60C 11/24 152/154.2 |
| 2013/0312886 | A1 * | 11/2013 | Ohno .................. B60C 9/0292 152/209.1 |
| 2014/0311642 | A1 | 10/2014 | Nagayoshi |

FOREIGN PATENT DOCUMENTS

| | | | |
|---|---|---|---|
| EP | 2591923 | A2 | 5/2013 |
| EP | 3112186 | A1 * | 1/2017 |
| JP | 58-177703 | A * | 10/1983 |
| JP | 06-016106 | U * | 3/1994 |
| JP | 2004-026141 | A * | 1/2004 |
| JP | 2016-112926 | A * | 6/2016 |
| JP | 6055521 | B1 | 12/2016 |

OTHER PUBLICATIONS

Machine translation for Japan 58-177703 (Year: 2020).*
Machine translation for Japan 06-016106 U (Year: 2020).*
Machine translation for Japan 2004-026141 (Year: 2020).*
Extended European Search Report for European Application No. 18164789.2, dated Jun. 25, 2018.

* cited by examiner

TIRE

BACKGROUND ART

Field of the Disclosure

The present disclosure relates to a tire, and more particularly to a tire capable of exerting an excellent performance when traveling under severe cornering force in racing circuits.

Description of the Related Art

Japanese Patent No. 6055521 discloses a tire which is mainly used for traveling under severe cornering force in racing circuits. The tire is provided with a main groove which continuously extends in a tire circumferential direction only on an inboard tread portion which is to be positioned in an inboard of a vehicle when being installed to the vehicle.

Unfortunately, the tire disclosed in the Patent Literature 1 has a problem that a satisfactory traveling performance cannot be obtained, for example, in racing circuits traveling in a wet state.

SUMMARY OF THE DISCLOSURE

The present disclosure has been made by taking the problem as mentioned above into consideration, and a main object of the present disclosure is to provide a tire capable of exerting an excellent wet performance while maintaining a dry grip performance and an uneven wear resistance when traveling under severe cornering force in racing circuits.

According to one aspect of the disclosure, a tire includes a tread portion having a designated installing direction to a vehicle, the tread portion including an outboard tread edge to be positioned in an outboard of a vehicle when being installed to the vehicle, an inboard tread edge to be positioned in an inboard of a vehicle when being installed to the vehicle, first to third main grooves continuously extending in a tire circumferential direction and land portions divided by the first to third main grooves.

The first main groove has a groove centerline being arranged on a side of the inboard tread edge with respect to a tire equator, the groove centerline being located at a distance L1 in a tire axial direction from the tire equator in a range of from 5% to 25% of a tread half width.

The second main groove is arranged between the first main groove and the inboard tread edge, and the second main groove has a groove centerline located at a distance L2 in the tire axial direction from the tire equator in a range of from 35% to 65% of the tread half width.

The third main groove is arranged between the tire equator and the outboard tread edge, and the third main groove has a groove centerline located at a distance L3 in the tire axial direction from the tire equator in a range of from 25% to 55% of the tread half width. A groove width of the third main groove is smaller than groove widths of the first main groove and the second main groove.

The land portions include an inboard crown land portion defined between the first main groove and the second main groove, an outboard crown land portion defined between the first main groove and the third main groove, and having a width in the tire axial direction greater than that of the inboard crown land portion, an inboard shoulder land portion defined between the second main groove and the inboard tread edge and an outboard shoulder land portion defined between the third main groove and the outboard tread edge, wherein each of the outboard crown land portion, the inboard shoulder land portion and the outboard shoulder land portion is provided with closed grooves closed in each of the outboard crown land portion, the inboard shoulder land portion and the outboard shoulder land portion.

In another aspect of the disclosure, the closed grooves may include deep closed grooves and shallow closed grooves which are different in their depth from each other.

In another aspect of the disclosure, the deep closed grooves and the shallow closed grooves may be arranged alternately in the tire circumferential direction in at least one of the outboard crown land portion, the inboard shoulder land portion and the outboard shoulder land portion.

In another aspect of the disclosure, each of the closed grooves may be long from side to side in the tire axial direction, and an angle of a longitudinal direction of each of the closed grooves and the tire axial direction is in a range of from 0 to 20 degrees.

In another aspect of the disclosure, the closed grooves may include an inboard shoulder closed groove provided on the inboard shoulder land portion, an outboard shoulder closed groove provided on the outboard shoulder land portion and an outboard crown closed groove provided on the outboard crown land portion.

In the tire axial direction, the inboard shoulder closed groove may have a length smaller than those of the outboard shoulder closed groove and the outboard crown closed groove.

In another aspect of the disclosure, each of the inboard shoulder closed groove, the outboard shoulder closed groove and the inside crown closed groove may have a length in the tire axial direction in a range of from 10 to 30 mm.

In another aspect of the disclosure, the groove widths of the first main groove and the second main groove may be in a range of from 5.0 to 15.0 mm.

In another aspect of the disclosure, the groove width of the third main groove may be in a range of from 2.5 to 6.0 mm.

In another aspect of the disclosure, each of the first main groove, the second main groove and the third main groove may have a depth in a range of from 4.0 to 7.0 mm.

In another aspect of the disclosure, in a cross-sectional view of each of the first to third main grooves, the first to third main grooves each may have a pair of groove walls extending radially outwardly linearly from a groove bottom, and an angle $\theta 1$ between the pair of groove walls of the first main groove, and an angle $\theta 2$ between the pair of groove walls of the second main groove may be in a range of from 45 to 75 degrees.

In another aspect of the disclosure, an angle $\theta 3$ between the pair of groove walls of the third main groove may be in a range of from 0 to 45 degrees.

In another aspect of the disclosure, at least one of the outboard crown land portion and the inboard shoulder land portion may be provided with lateral grooves, and each of the lateral grooves may have one end connected to one of the main grooves and the other end without being connected to the main grooves.

In another aspect of the disclosure, the closed grooves and the lateral grooves may be arranged alternately in the tire circumferential direction.

In another aspect of the disclosure, the lateral grooves may have depths smaller than that of the closed grooves.

DESCRIPTION OF THE PREFERRED EMBODIMENTS

An embodiment of the present invention will be explained below with reference to the accompanying drawings.

Figure 1:
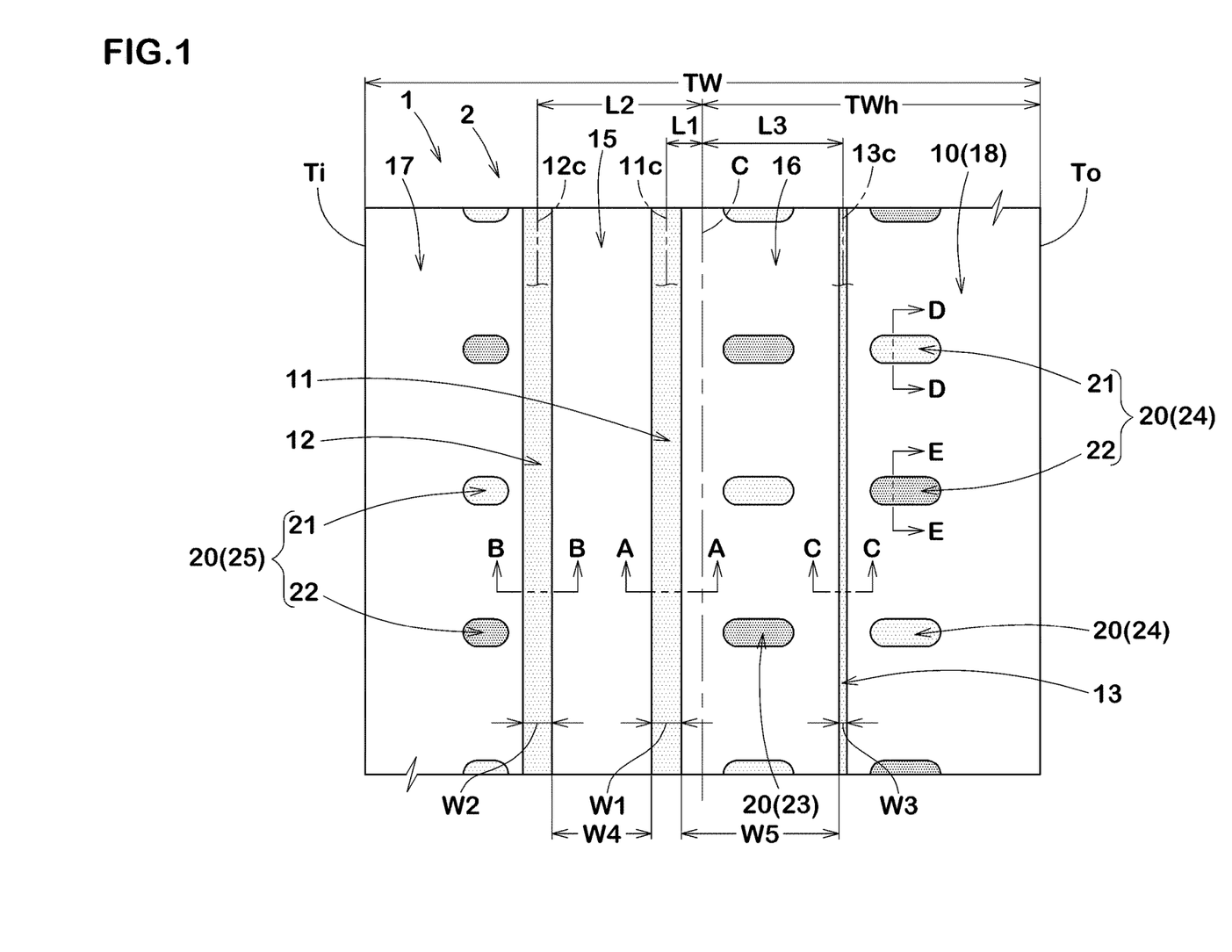
FIG. 1 is a development view of a tread portion of a tire according to an embodiment of the present disclosure.

FIG. 1 is a development view of a tread portion 2 of a tire 1 according to the present embodiment. The tire 1 according to the present embodiment is used, for example, as a pneumatic tire for passenger cars, and is preferably used in particular as a high-performance tire on the assumption that it is used in racing circuits.

The tire 1 includes a tread portion 2 having a designated installing direction to a vehicle.

The installing direction to the vehicle is indicated, for example, by letters or marks on a sidewall portion (not illustrated). In FIG. 1, in the case that the tire 1 is installed to a vehicle, a left side in FIG. 1 corresponds to a vehicle inboard side, and a right side in FIG. 1 corresponds to a vehicle outboard side.

Due to the designated installing direction to a vehicle, the tread portion 2 has an outboard tread edge To which is to be positioned in an outboard of a vehicle when being installed to the vehicle, and an inboard tread edge Ti which is to be positioned in an inboard of a vehicle when being installed to the vehicle.

In the case of the pneumatic tire, the tread edges To and Ti refer to axially outermost edges of the ground contacting patch of the tread portion 2 which occurs under a normally inflated loaded condition when the camber angle of the tire is zero. The normally inflated loaded condition is such that the tire 1 is mounted on a standard wheel rim (not illustrated) and inflated to a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

The tread portion 2 includes first to third main grooves 11 to 13 which continuously extend in a tire circumferential direction and land portions 10 divided by the first to third main grooves 11 to 13.

The first to third main grooves 11 to 13 extend, for example, linearly along the tire circumferential direction. The first to third main grooves 11 to 13 are not limited to the aspect mentioned above, but may be configured, for example, to extend in a wavy manner or a zigzag manner.

The first main groove 11 is arranged so that a groove center line 11c thereof is located on a side of the inboard tread edge Ti with respect to the tire equator C. The first main groove 11 according to the present embodiment is arranged, for example, so that groove edges in both sides are located on the side of the inboard tread edge Ti to the tire equator C.

In the first main groove 11, a distance L1 in the tire axial direction from the tire equator C to the groove center line is in a range of from 5% to 25% of a tread half width TWh. The tread half width TWh is an axial length which is half of a tread width TW. The tread width TW is a distance in the tire axial direction from the inboard tread edge Ti to an outboard tread edge To under a normal condition. The normal condition is such that the tire 1 is mounted on the standard wheel rim and inflate to the standard pressure but loaded with no tire load. In this application including specification and claims, various dimensions, positions and the like of the tire 1 refer to those under the normal condition of the tire unless otherwise noted.

The second main groove 12 is arranged between the first main groove 11 and the inboard tread edge Ti. In the second main groove 12, a distance L2 in the tire axial direction from the tire equator C to a groove center line 12c thereof is in a range of from 35% to 65% of the tread half width TWh.

The third main groove 13 is arranged between the tire equator C and the outboard tread edge To. In the third main groove 13, a distance L3 in the tire axial direction from the tire equator C to a groove center line 13c thereof is in a range of from 25% to 55% of the tread half width TWh.

A groove width W3 of the third main groove 13 is smaller than a groove width W1 of the first main groove 11 and a groove width W2 of the second main groove 12.

The first main groove 11 and the second main groove 12 effectively discharge the water between the tread portion 2 and the road surface, for example, when traveling under a wet condition in racing circuits, and are of use to achieve an excellent wet performance. In the first main groove 11 and the second main groove 12 according to the present disclosure, the distances from the tire equator C are specified in certain ranges. As a result, it is possible to enhance wet performance while suppressing an excessive rigidity reduction of the land portion and maintaining dry grip.

When cornering under severe cornering force, a high ground contact pressure tends to act on an area between the tire equator C and the outboard tread edge To. In the present disclosure, the area is provided with the third main groove 13 which is specified in the distance from the tire equator C and has the relatively small groove width. As a result, the rigidity of the area is secured, and the excellent dry grip performance and uneven wear resistance can be further achieved. Further, since a high ground contact pressure acts on the third main groove 13 upon cornering, the third main groove 13 can achieve sufficient drainage performance when traveling under the wet condition even in the case that the third main groove 13 has the relatively small groove width.

In order to further achieve the effects mentioned above, the distance L1 of the first main groove 11 is preferably equal to or more than 8% of the tread half width TWh, more preferably equal to or more than 10%, preferably equal to or less than 20%, and more preferably equal to or less than 15%. The distance L2 of the second main groove 12 is preferably equal to or more than 40% of the tread half width TWh, more preferably equal to or more than 45%, preferably equal to or less than 60%, and more preferably equal to or less than 55%. The distance L3 of the third main groove 13 is preferably equal to or more than 35% of the tread half width TWh, more preferably equal to or more than 40%, preferably equal to or less than 50%, and more preferably equal to or less than 45%.

Each of the groove width W1 of the first main groove 11 and the groove width W2 of the second main groove 12 is preferably equal to or more than 5.0 mm, more preferably equal to or more than 8.0 mm, preferably equal to less than 15.0 mm, and more preferably equal to or less than 12 mm. In some preferred embodiments, the groove width W1 of the first main groove 11 is the same as the groove width W2 of the second main groove 12. The first main groove 11 and the second main groove 12 mentioned above are of use to enhance dry grip performance and wet performance with a well-balanced manner.

For example, the groove width W3 of the third main groove 13 is preferably in a range of from 0.20 to 0.50 times the groove width W1 of the first main groove 11. More specifically, the groove width W3 of the third main groove 13 is preferably equal to or more than 2.5 mm, more preferably equal to or more than 3.5 mm, preferably equal to or less than 6.0 mm, and more preferably equal to or less than 5.0 mm.

Figure 2A:
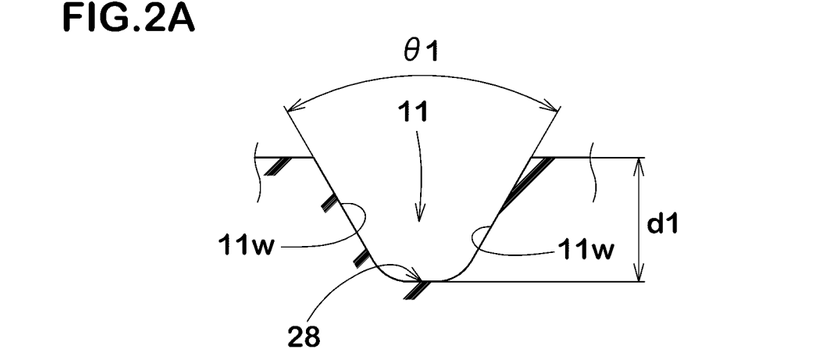
FIGS. 2A to 2C are cross sectional views taken along lines A-A, B-B and C-C of FIG. 1, respectively.
Figure 2B:
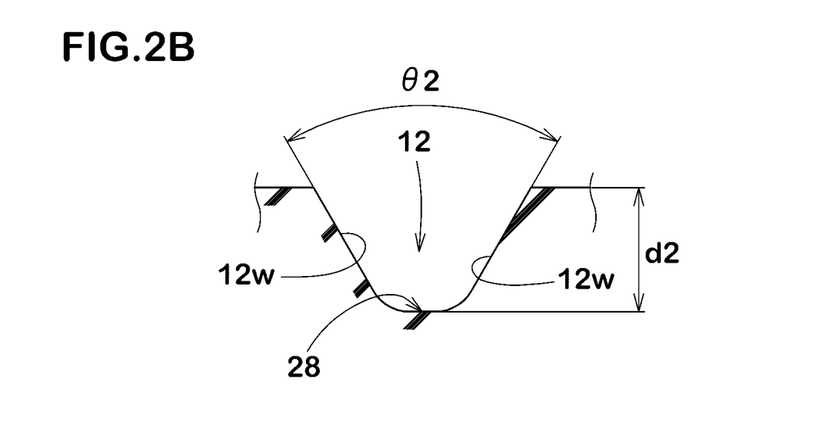
Figure 2C:
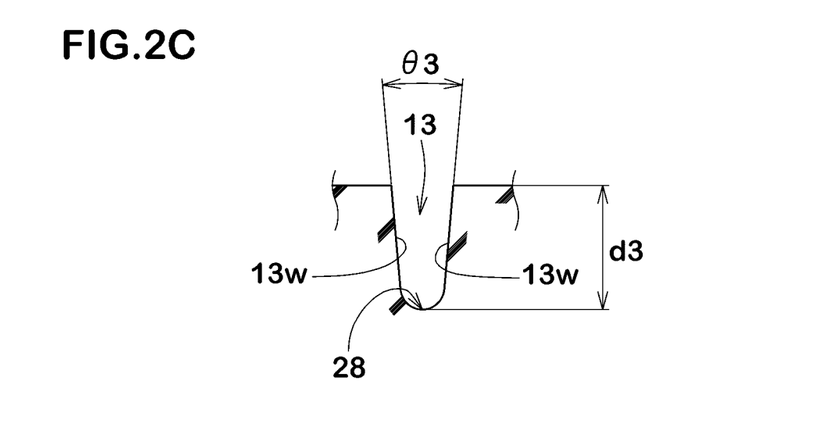

FIGS. 2A to 2C are cross sectional views taken along lines A-A, B-B and C-C of FIG. 1, respectively. As illustrated in FIGS. 2A to 2C, each of a depth d1 of the first main groove 11, a depth d2 of the second main groove 12, and a depth d3 of the third main groove 13 is preferably equal to or more than 4.0 mm, more preferably equal to or more than 5.0 mm, preferably equal to or less than 7.0 mm, and more preferably equal to or less than 6.0 mm.

In some preferred embodiments, the first main groove 11, the second main groove 12, and the third main groove 13 have the same depth as each other. As a result, each of the land portions divided by the main grooves tends to be uniformly worn.

Each of the main grooves 11 to 13 has a pair of groove walls which extend radially outwardly linearly from a groove bottom 28. An angle θ1 between a pair of groove walls 11w of the first main groove 11 and an angle θ2 between a pair of groove walls 12w of the second main groove 12 are preferably equal to or more than 45 degrees, more preferably equal to or more than 50 degrees, preferably equal to or less than 75 degrees, and more preferably equal to or less than 65 degrees. The first main groove 11 and the second main groove 12 mentioned above can suppress collapsing of each of the land portions in the tire axial direction and can achieve an excellent cornering performance when traveling under a dry condition.

An angle θ3 between a pair of groove walls 13w of the third main groove 13 is preferably smaller than the angles θ1 and θ2 mentioned above. Specifically, the angle θ3 between a pair of groove walls of the third main groove 13 is preferably equal to or more than 0 degrees, more preferably equal to or more than 10 degrees, preferably equal to or less than 45 degrees, and more preferably equal to or less than 35 degrees. As a result, the land portions tend to be appropriately deformed in the tire axial direction in the area between the tire equator C and the outboard tread edge To. Therefore, since the area tends to generate heat on the basis of the repeating deformation when traveling, a temperature in the area tends to rise up to an appropriate temperature when starting the traveling, and a tire original gripping performance can be achieved in an early stage (hereinafter, the performance mentioned above may be called as "warming performance").

As illustrated in FIG. 1, the land portions 10 include an inboard crown land portion 15, an outboard crown land portion 16, an inboard shoulder land portion 17, and an outboard shoulder land portion 18. The inboard crown land portion 15 is defined between the first main groove 11 and the second main groove 12. The outboard crown land portion 16 is defined between the first main groove 11 and the third main groove 13 and has a width W5 in the tire axial direction which is greater than the inboard crown land portion 15. The inboard shoulder land portion 17 is defined between the second main groove 12 and the inboard tread edge Ti. The outboard shoulder land portion 18 is defined between the third main groove 13 and the outboard tread edge To.

Since the width W5 of the outboard crown land portion 16 on which the great ground contact pressure acts upon cornering is secured to be great, the tire according to the present disclosure can achieve the excellent dry grip performance and uneven wear resistance.

In order to further enhance the effects mentioned above, the width W5 of the outboard crown land portion 16 is preferably equal to or more than 1.45 times the width W4 in the tire axial direction of the inboard crown land portion 15, more preferably equal to or more than 1.55 times, preferably equal to or less than 1.70 times and more preferably equal to or less than 1.60 times.

Each of the outboard crown land portion 16, the inboard shoulder land portion 17 and the outboard shoulder land portion 18 is provided with closed grooves 20 which close within the land portions. The closed grooves 20 closed in the land portions at least include an aspect that contours thereof are not connected to any one of the main grooves or the tread edges dividing the land portions.

The closed grooves 20 are of use to appropriately reduce rigidity of the land portions while enhancing wet performance. Thus, the rigidity difference among the inboard crown land portion 15, the outboard crown land portion 16, the inboard shoulder land portion 17 and the outboard shoulder land portion 18 having the relatively small width becomes small, and uneven wear resistance may be enhanced. Further, the land portions provided with the closed grooves 20 are appropriately reduced its rigidity and can achieve an excellent warming performance. Further, the land portions appropriately deform in such a manner as to be along the road surface upon grounding, and drivers further tend to comprehend a change in grip force when traveling critically (the performance mentioned above may be hereinafter called as "grounding property").

The closed grooves 20 according to the present embodiment are preferably formed, for example, to be long from side to side in the tire axial direction. The closed grooves 20 are preferably formed, for example, into an elliptic shape which is long from side to side in the tire axial direction. The closed grooves 20 mentioned above achieve an excellent uneven wear resistance and warming performance while suppressing rigidity reduction of the land portions in the tire axial direction. The closed grooves 20 are not limited to the aspect mentioned above, but may be formed into various contour aspects, for example, a circular shape, an oval shape, and a rectangular shape. Further, the closed grooves 20 may extend to any direction in its longitudinal direction.

In order to further achieve the effect mentioned above, the closed grooves 20 are preferably configured, for example, such that an angle θ4 (not shown) between the longitudinal direction thereof and the tire axial direction is in a range of from 0 to 20 degrees.

Figure 3A:
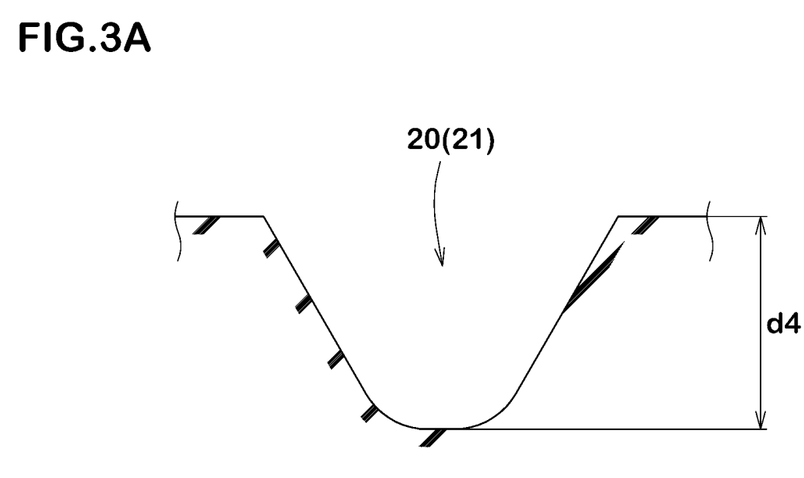
FIGS. 3A and 3B are cross sectional views taken along lines C-C and D-D of FIG. 1, respectively.
Figure 3B:
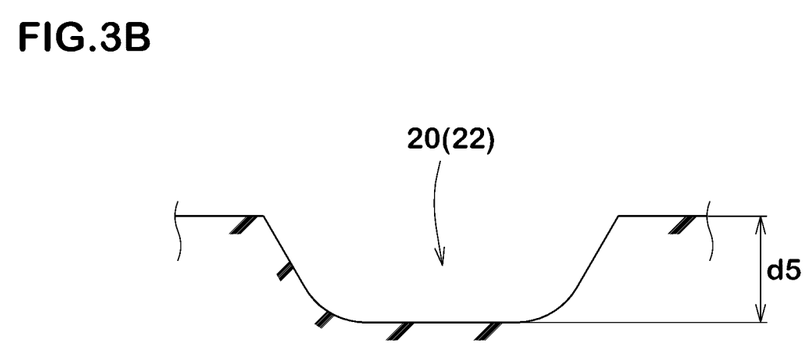

The closed grooves 20 preferably includes, for example, deep closed grooves 21 and shallow closed grooves 22 which are different in their depth from each other. In FIG. 1, the deep closed grooves 21 and the shallow closed grooves 22 are colored, and the shallow closed grooves 22 are colored more strongly than the deep closed grooves 21. FIG. 3A illustrates a cross-sectional view of one of the deep closed grooves 21 taken along a line D-D of FIG. 1. FIG. 3B illustrates a cross-sectional view of one of the shallow closed grooves 22 taken along a line E-E of FIG. 1. As illustrated in FIGS. 3A and 3B, the deep closed grooves 21 preferably have depths d4, for example, which are in a range of from 0.50 to 0.70 times a depth d1 (shown in FIG. 2A) of the first main groove 11. Specifically, depths d4 of the deep closed grooves 21 are preferably, for example, in a range of from 3.5 to 4.5 mm.

For example, the shallow closed grooves 22 preferably have depths d5 which is in a range of from 0.40 to 0.60 times depths d4 of the deep closed grooves 21. Specifically, the depths d5 of the shallow closed grooves 22 are preferably in a range of from 1.5 to 2.5 mm, for example.

As illustrated in FIG. 1, it is preferable that the deep closed grooves 21 and the shallow closed grooves 22 are alternately arranged in the tire circumferential direction in at least one of the outboard crown land portion 16, the inboard shoulder land portion 17 and the outboard shoulder land portion 18. In some preferred embodiments, the deep closed grooves 21 and the shallow closed grooves 22 are alternately arranged in the tire circumferential direction in each of the land portions. In a layout of the closed grooves 20 as mentioned above, since the portions having different rigidity are dispersed appropriately, it is possible to uniformize the progress of wear in the land portion.

Figure 4:
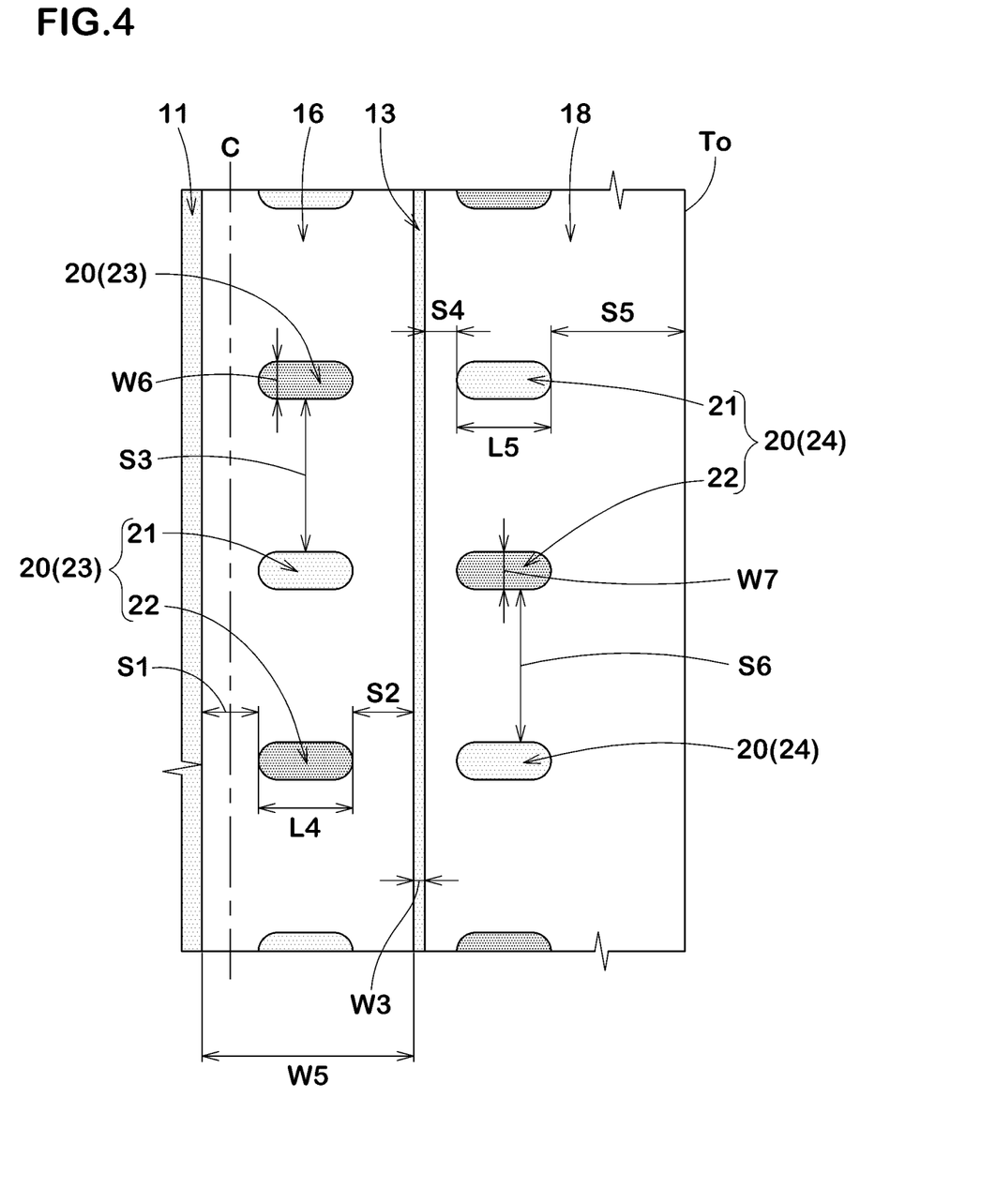
FIG. 4 is an enlarged view of an outboard crown land portion and an outboard shoulder land portion in FIG. 1.

FIG. 4 illustrates an enlarged view of the outboard crown land portion 16 and the outboard shoulder land portion 18. As illustrated in FIG. 4, the closed grooves 20 include a plurality of outboard crown closed grooves 23 which are provided on the outboard crown land portion 16, and a plurality of outboard shoulder closed grooves 24 which are provided on the outboard shoulder land portion 18.

For example, lengths L4 of the outboard crown closed grooves 23 in the tire axial direction, and lengths L5 of the outboard shoulder closed grooves 24 in the tire axial direction are preferably in a range of from 10 to 30 mm, and more preferably in a range of from 20 to 30 mm. In some preferred embodiments, the outboard crown closed grooves 23 and the outboard shoulder closed grooves 24 have the same length as each other.

For example, widths W6 of the outboard crown closed grooves 23 and widths W7 of the outboard shoulder closed grooves 24 are preferably smaller than the groove width W1 of the first main groove 11. Each of the widths W6 and W7 is measured, for example, in a direction which is perpendicular to a longitudinal direction of the closed groove. For example, the widths W6 and W7 are preferably in a range of from 0.85 to 0.95 times of the groove width W1. As a result, dry grip performance and wet performance of the tire can be enhanced with a well-balanced manner. In some preferred embodiments, the outboard crown closed grooves 23 and the outboard shoulder closed grooves 24 have the same width as each other. The closed grooves 23 and 24 mentioned above can uniformize the progress of wear in the outboard crown land portion 16 and the outboard shoulder land portion 18.

For example, the shortest distance S1 from an edge of the first main groove 11 to an edge of each outboard crown closed groove 23, and the shortest distance S2 from an edge of the third main groove 13 to an edge of each outboard crown closed groove 23 are preferably greater than the groove width W1 (shown in FIG. 1) of the first main groove 11. In some preferred embodiments, the shortest distances S1 and S2 are preferably in a range of from 1.35 to 1.50 times the groove width W1 of the first main groove 11, for example. A layout of the outboard crown closed grooves 23 mentioned above can achieve an excellent warming performance while suppressing uneven wear in the edge of the outboard crown land portion 16.

For example, the shortest distance S3 in the tire circumferential direction of the outboard crown closed grooves 23 which are adjacent in the tire circumferential direction is preferably smaller than the width W5 of the outboard crown land portion 16 in the tire axial direction. Specifically, the shortest distance S3 is preferably in a range of from 0.65 to 0.80 times the width W5. A layout of the outboard crown closed grooves 23 as mentioned above can appropriately reduce rigidity of the outboard crown land portion 16 and can achieve the excellent warming performance and grounding property.

For example, the shortest distance S4 from an edge of the third main groove 3 to an edge of each outboard shoulder closed grooves 24 is preferably smaller than the groove width W1 of the first main groove 11. Specifically, the shortest distance S4 is preferably in a range of from 0.75 to 0.85 times the groove width W1, for example. In some preferred embodiments, the shortest distance S4 is greater than the groove width W3 of the third main groove 13, for example. A layout of the outboard shoulder closed grooves 24 as mentioned above can suppress uneven wear in the edge of the outboard shoulder land portion 18 in the third main groove 13 side.

The shortest distance S5 from the outboard tread edge (To) to the edge of each outboard shoulder closed grooves 24 is greater than the shortest distance S4, for example. Further, the shortest distance S5 is greater than the lengths L5 of the outboard shoulder closed grooves 24. Specifically, the shortest distance S5 is preferably in a range of from 1.35 to 1.40 times the lengths L5 of the outboard shoulder closed grooves 24. The outboard shoulder closed grooves 24 as mentioned above can secure rigidity in the vicinity of the outboard tread edge To, can enhance cornering performance when traveling under the dry condition and can suppress uneven wear in the vicinity of the outboard tread edge To.

The shortest distance S6 in the tire circumferential direction of the outboard shoulder closed grooves 24 which are adjacent each other in the tire circumferential direction is preferably in a range of from 0.90 to 1.10 times the shortest distance S3 in the tire circumferential direction of the outboard crown closed grooves 23 which are adjacent each other in the tire circumferential direction, for example. In some preferred embodiments, the shortest distance S6 is the same as the shortest distance S3.

Each of the outboard shoulder closed grooves 24 according to the present embodiment is adjacent to the outboard crown closed groove 23 each other in the tire axial direction. More specifically, a projection area of each of the outboard shoulder closed grooves 24 in the tire axial direction intersects with at least a part of any outboard crown closed groove 23. A layout of each of the closed grooves 20 as mentioned above is of use to further promote deformation of each of the land portions when traveling with the tire and achieve an excellent warming performance and grounding property.

In some preferred embodiments, the deep closed grooves 21 provided on the outboard shoulder land portion 18 are adjacent to the shallow closed grooves 22 provided on the outboard crown land portion 16 in the tire axial direction. The shallow closed grooves 22 provided on the outboard shoulder land portion 18 are adjacent to the deep closed grooves 21 provided on the outboard crown land portion 16 in the tire axial direction. A layout of each of the closed grooves 20 can uniformize rigidity distribution of the land portions and can further suppress uneven wear in the land portion.

Figure 5:
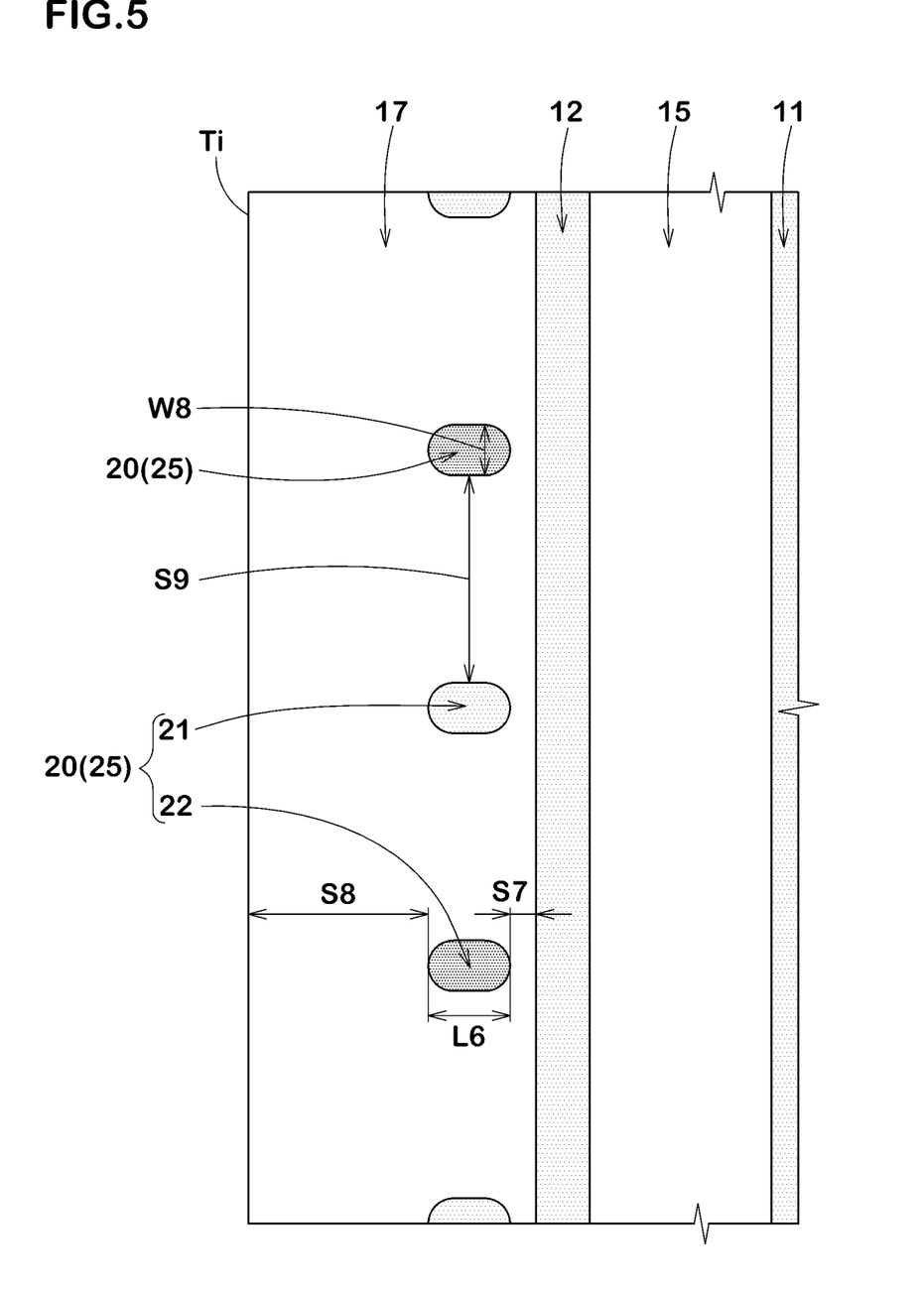
FIG. 5 is an enlarged view of an inboard crown land portion and an inboard shoulder land portion in FIG. 1.

FIG. 5 illustrates an enlarged view of the inboard crown land portion 15 and the inboard shoulder land portion 17. As illustrated in FIG. 5, the inboard crown land portion 15 according to the present embodiment is preferably configured as a plain rib which is not provided with any grooves and any closed grooves, for example. The inboard crown land portion 15 as mentioned above can achieve an excellent dry grip performance and uneven wear resistance together with the outboard crown land portion 16 mentioned above.

For example, the closed grooves 20 includes a plurality of inboard shoulder closed grooves 25 which are provided on the inboard shoulder land portion 17.

For example, the inboard shoulder closed grooves 25 preferably have lengths L6 in the tire axial direction which is smaller than the outboard shoulder closed grooves 23 and the outboard crown closed grooves 24 (shown in FIG. 4). Specifically, the lengths L6 of the inboard shoulder closed grooves 25 in the tire axial direction are preferably in a range of from 10 to 30 mm and more preferably in a range of from 10 to 20 mm, for example. The inboard shoulder closed grooves 25 as mentioned above can maintain rigidity of the inboard shoulder land portion 17 relatively high and can enhance dry grip performance.

Widths W8 of the inboard shoulder closed grooves 25 are preferably smaller than the groove width W1 of the first main groove 11, for example. The widths W8 is preferably in a range of from 0.85 to 0.95 times the groove width W1, for example. In the present embodiment, the inboard shoulder closed grooves 25, the outboard crown closed grooves 23 and the outboard shoulder closed grooves 24 have the same width as each other.

The shortest distance S7 from the edge of the second main groove 12 to an edge of each inboard shoulder closed groove 25 is preferably smaller than the shortest distance S4 (shown in FIG. 4) from the third main groove 13 to the edge of each outboard shoulder closed groove 24, for example. In some preferred embodiments, the shortest distance S7 is in a range of from 0.50 to 0.65 times the shortest distance S4, for example. A layout of the inboard shoulder closed grooves 25 as mentioned above can uniformize the progress of wear on the edge of the inboard shoulder land portion 17 in the second main groove 12 side, and the edge of the outboard shoulder land portion 18 in the third main groove 13 side.

The shortest distance S8 from the inboard tread edge Ti to the edge of each inboard shoulder closed groove 25 is preferably greater than the shortest distance S7, for example. Further, the shortest distance S8 is preferably greater than the lengths L6 of the inboard shoulder closed grooves 25. Specifically, the shortest distance S8 is preferably in a range of from 2.0 to 2.5 times the lengths L6 of the inboard shoulder closed grooves 25. In some preferred embodiments, the shortest distance S8 from the inboard tread edge Ti to the edge of each inboard shoulder closed groove 25 is substantially the same as the shortest distance S5 from the outboard tread edge (To) to the edge of each outboard shoulder closed groove 24. A layout of the closed grooves 20 as mentioned above can uniformize the progress of wear in the vicinity of the inboard tread edge Ti and the outboard tread edge To.

The shortest distance S9 in the tire circumferential direction of the inboard shoulder closed grooves 25 which are adjacent each other in the tire circumferential direction is preferably in a range of from 0.90) to 1.10 times the shortest distance S3 in the tire circumferential direction of the outboard crown closed grooves 23 which are adjacent each other in the tire circumferential direction, for example. In some preferred embodiments, the shortest distance S9 is the same as the shortest distance S3.

The inboard shoulder closed grooves 25 according to the present embodiment are adjacent to the outboard crown closed grooves 23 (shown in FIG. 4) each other in the tire axial direction. More specifically, a projection area of each of the inboard shoulder closed grooves 25 in the tire axial direction intersects with at least a part of one of outboard crown closed grooves 23.

In some preferred embodiments, the deep closed grooves 21 provided on the inboard shoulder land portion 17 are adjacent to the shallow closed grooves 22 provided on the outboard crown land portion 16 each other in the tire axial direction. The shallow closed grooves 22 provided on the inboard shoulder land portion 17 are adjacent to the deep closed grooves 21 provided on the inboard crown land portion 15 each other in the tire axial direction. A layout of the closed grooves 20 as mentioned above can uniformize rigidity distribution of the land portions and can further suppress uneven wear in the land portions.

Figure 6:
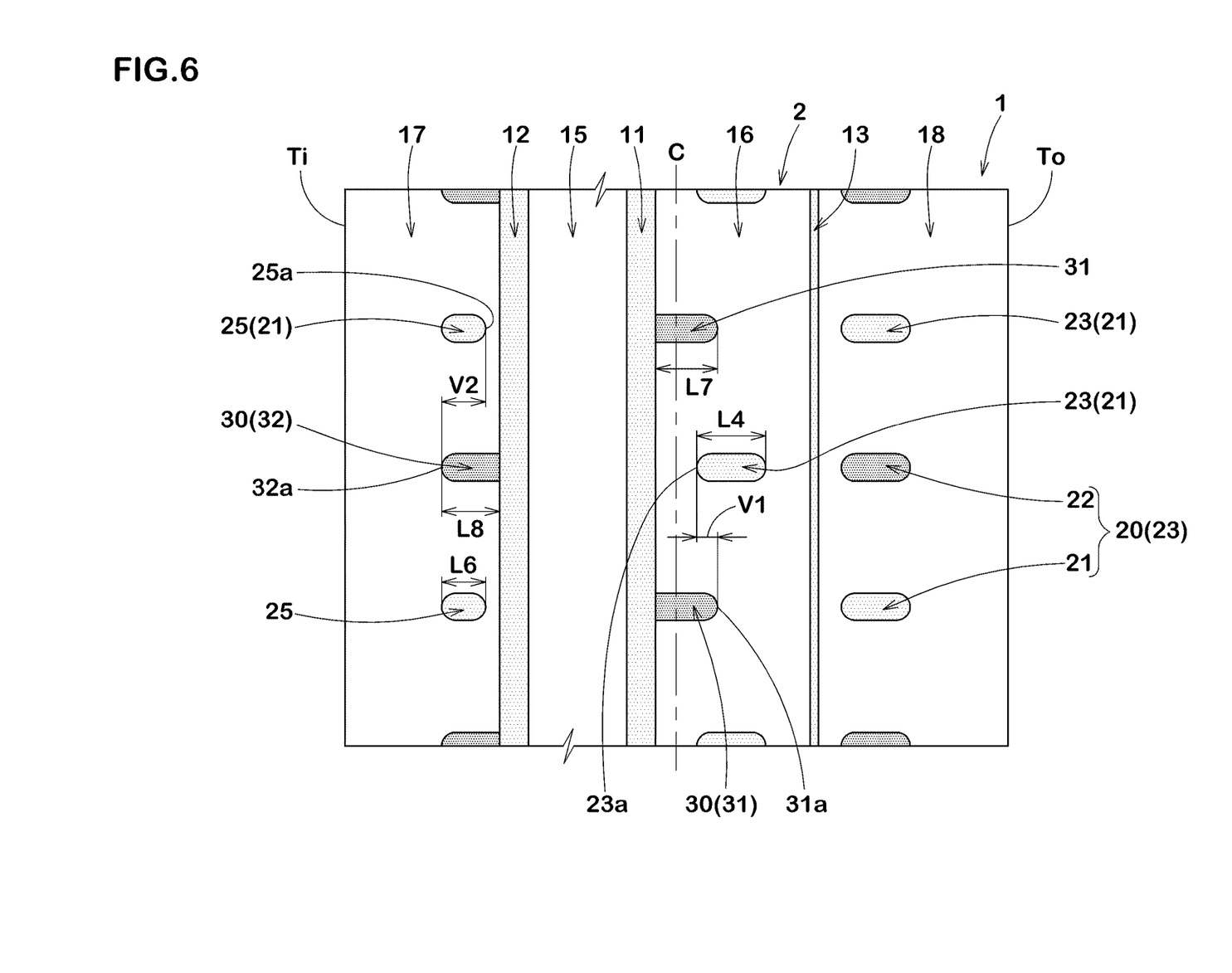
FIG. 6 is a development view of a tread portion of a tire according to another embodiment of the present disclosure.

FIG. 6 illustrates a development view of the tread portion 2 of the tire 1 according to another embodiment of the present disclosure. In FIG. 6, the same reference numerals are attached to common elements with those of the embodiment mentioned above, and a description will be omitted here.

As illustrated in FIG. 6, a plurality of lateral grooves 30 are provided on at least one of the outboard crown land portion 16 and the inboard shoulder land portion 17 in this embodiment. The lateral grooves 30 each have one end connected to one main groove and the other end terminating within the land portion. In some preferred embodiments, the lateral grooves 30 are provided on each of the outboard crown land portion 16 and the inboard shoulder land portion 17. The lateral groove 30 as mentioned above can enhance wet performance together with each of the main grooves.

The closed grooves 20 and the lateral grooves 30 are arranged alternately in the tire circumferential direction, for example. A layout of the closed grooves 20 and the lateral grooves 30 is of use to suppress uneven wear in the land portion.

The lateral grooves 30 preferably have depths which are smaller than that of the closed grooves 20, for example. In this embodiment, the deep closed grooves 21 mentioned above are arranged as the closed grooves 20. The lateral grooves 30 preferably have depths which are in a range of from 0.80 to 0.90 times the deep closed grooves 21, for example.

For example, the lateral grooves 30 are preferably formed into a contour shape which is long from side to side in the tire axial direction. An angle θ5 (not shown) of each of the lateral grooves 30 between the longitudinal direction thereof and the tire axial direction may be preferably in a range of from 0 to 20 degrees, for example. As a result, the lateral grooves 30 can enhance a friction force in the tire circumferential direction, and an excellent traction performance can be further obtained.

For example, the lateral grooves 30 include outboard crown lateral grooves 31 which are provided on the outboard crown land portion 16, and inboard shoulder lateral grooves 32 which are provided on the inboard shoulder land portion 17. The outboard crown lateral grooves 31 each have one end connected to the first main groove 11 and the other end terminating within the outboard crown land portion 16. The inboard shoulder lateral grooves 32 each have one end connected to the second main groove 12 and the other end terminating within the inner shoulder land portion 17.

For example, the outboard crown lateral grooves 31 preferably have lengths L7 in the tire axial direction which are smaller than that of the outboard crown closed grooves 23. Specifically, the lengths L7 of the outboard crown lateral grooves 31 are preferably in a range of from 0.80 to 0.95 times the lengths L4 of the outboard crown closed grooves 23 in the tire axial direction. The outboard crown lateral grooves 31 as mentioned above can enhance traction performance while suppressing an excessive rigidity reduction of the outboard crown land portion 16.

For example, the outboard crown lateral grooves 31 preferably overlap the outboard crown closed grooves 23 in the tire axial direction. In other words, the other ends 31a of the outboard crown lateral grooves 31 on a side of the outboard tread edge To are located on a side of the outboard tread edge To with respect to ends 23a of the outboard crown closed grooves 23 located on a side of the inboard tread edge Ti. A layout of the outboard crown lateral grooves 31 as mentioned above is of use to appropriately deform the outboard crown land portion 16 and can further enhance warming performance and grounding property.

In order to further enhance the effect mentioned above, overlapping lengths V1 of the outboard crown lateral grooves 31 and the outboard crown closed grooves 23 are preferably in a range of from 0.30 to 0.40 times the lengths L7 of the outboard crown lateral grooves 31 in the tire axial direction, for example.

In order to enhance warming performance and grounding property of the tire, the inboard shoulder lateral grooves 32 preferably have lengths L8 in the tire axial direction which are greater than that of the inboard shoulder closed grooves 25, for example. Specifically, the lengths L8 of the inboard shoulder lateral grooves 32 are preferably in a range of from 1.25 to 1.40 times the lengths L6 of the inboard shoulder closed grooves 25 in the tire axial direction.

For example, the inboard shoulder lateral grooves 32 preferably overlap the inboard shoulder closed grooves 25 in the tire axial direction. In other words, the other ends 32a of the inboard shoulder lateral grooves 32 on a side of the inboard tread edge Ti are located on a side of the inboard tread edge Ti with respect to the ends 25a of the inboard shoulder closed grooves 25 located on a side of the tire equator C. A layout of the inboard shoulder lateral grooves 32 as mentioned above is of use to appropriately deform the inboard shoulder land portion 17 and can obtain an excellent warming performance and grounding property.

In order to further enhance the effect mentioned above, overlapping lengths V2 of the inboard shoulder lateral grooves 32 and the inboard shoulder closed grooves 25 are preferably in a range of from 0.70 to 0.80 times the lengths L8 of the inboard shoulder lateral grooves 32 in the tire axial direction, for example.

While the particularly preferable embodiments in accordance with the present invention have been described in detail, the present invention is not limited to the illustrated embodiments but can be modified and carried out in various aspects.

EXAMPLES

Figure 7:
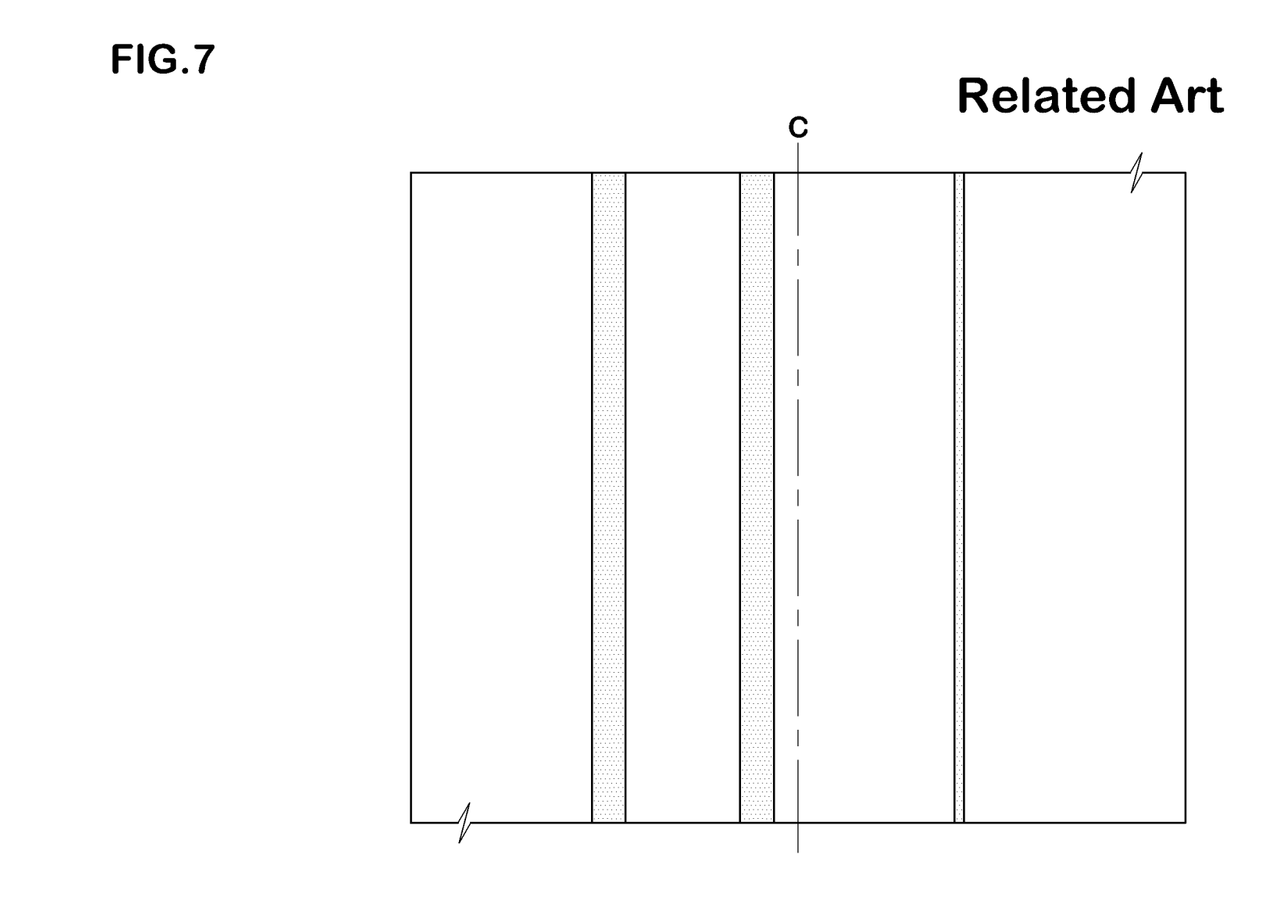
FIG. 7 is a development view of a tread portion of a tire according to a comparative example.

Pneumatic tires 235/40R18 with a basic tread pattern as shown in FIG. 1 were manufactured by way of trial on the basis of the specification in Table 1. A tire provided with no closed groove was manufactured by way of trial as illustrated in FIG. 7, as a comparative example. The tire according to the comparative example was substantially the same as the tire with the tread pattern in FIG. 1 except a point that the closed grooves are not provided. Lap time on a dry road surface, generating speed of hydroplaning phenomenon and uneven wear resistance were tested in each test tire. The common specification and the testing method of the test tires are as follows.

Rim: 18×8.5 J
Tire internal pressure: 180 kPa
Test vehicle: engine displacement 2,500 cc, four-wheel drive vehicle
Tread half width TWh=105.0 mm
Groove widths W1 and W2 of first and second main grooves: 10.0 mm
Groove width W3 of third main groove: 3.0 mm
Groove depths of main grooves: 5.5 mm
Lap Time on Dry Road Surface Test:
A test driver drove the test vehicle on a dry pavement racing track of 5 km long, and a lap time when circling one time was measured. The test results are shown in Table 1 by an index number in which the comparative example is assumed to be 100.
The smaller numeric value indicates the shorter lap time.
Generating Speed of Hydroplaning Phenomenon Test:
Using an inside drum tester, a generating speed of hydroplaning phenomenon was measured when each of the test tires running on a drum surface having a water depth 5.0 mm under the following condition. The test results are shown in Table 1 by an index number in which the comparative example 1 is assumed to be 100. The greater numeric value indicates the higher generating speed and the more excellent wet performance.
Slip angle: 1.0 degree
Longitudinal load: 3.92 kN
Tire internal pressure: 250 kPa
Uneven Wear Resistance Test:
A difference between a wear amount of the inboard crown land portion and a wear amount of the outboard crown land portion was measured after continuously traveling for 20 km on the orbiting course. The test results are shown in table 1 by an index number in which the difference in the comparative example is assumed to be 100. The smaller numeric value indicates the more uniform wear volume of the inboard crown land portion and the outboard crown land portion, and the more excellent uneven wear resistance.
Table 1 shows the test results.

TABLE 1

| | Comparative Ex. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Views showing tread pattern | FIG. 7 | FIG. 1 | FIG. 1 | FIG. 1 | FIG. 1 | FIG. 1 | FIG. 1 | FIG. 1 | FIG. 1 |
| Distance L1 of first main groove/tread half width TWh (%) | 10.6 | 10.6 | 5.0 | 15.0 | 20.0 | 25.0 | 10.6 | 10.6 | 10.6 |

TABLE 1-continued

|  |  |  |  |  |  |  |  |  |
|---|---|---|---|---|---|---|---|---|
| Distance L2 of second main groove/ tread half width TWh (%) | 49.1 | 49.1 | 49.1 | 49.1 | 49.1 | 35.0 | 40.0 | 60.0 |
| Distance L3 of third main groove/ tread half width TWh (%) | 43.0 | 43.0 | 43.0 | 43.0 | 43.0 | 43.0 | 43.0 | 43.0 |
| Angles $\theta 1$ and $\theta 2$ between groove walls of first main groove and second main groove (degree) | 60 | 60 | 60 | 60 | 60 | 60 | 60 | 60 |
| Angle $\theta 3$ between groove walls of third main groove (degree) | 10 | 10 | 10 | 10 | 10 | 10 | 10 | 10 |
| Lengths L4 and L5 of outboard crown closed grooves and outboard shoulder closed grooves (mm) | — | 30 | 30 | 30 | 30 | 30 | 30 | 30 |
| Lengths L6 of inboard shoulder closed grooves (mm) | — | 10 | 10 | 10 | 10 | 10 | 10 | 10 |
| Lap time on dry road surface (index number) | 100 | 95 | 101 | 96 | 97 | 97 | 99 | 97 | 97 |
| Generating speed of hydroplaning phenomenon (index number) | 100 | 104 | 106 | 103 | 103 | 102 | 104 | 104 | 105 |
| Uneven wear resistance (index number) | 100 | 100 | 102 | 100 | 101 | 102 | 100 | 100 | 100 |

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Views showing tread pattern | FIG. 1 | FIG. 1 | FIG. 1 | FIG. 1 | FIG. 1 | FIG. 1 | FIG. 1 | FIG. 1 | FIG. 1 |
| Distance L1 of first main groove/ tread half width TWh (%) | 10.6 | 10.6 | 10.6 | 10.6 | 10.6 | 10.6 | 10.6 | 10.6 | 10.6 |
| Distance L2 of second main groove/ tread half width TWh (%) | 65.0 | 49.1 | 49.1 | 49.1 | 49.1 | 49.1 | 49.1 | 49.1 | 49.1 |
| Distance L3 of third main groove/ tread half width TWh (%) | 43.0 | 25.0 | 40.0 | 50.0 | 55.0 | 43.0 | 43.0 | 43.0 | 43.0 |
| Angles $\theta 1$ and $\theta 2$ between groove walls of first main groove and second main groove (degree) | 60 | 60 | 60 | 60 | 60 | 45 | 50 | 65 | 75 |
| Angle $\theta 3$ between groove walls of third main groove (degree) | 10 | 10 | 10 | 10 | 10 | 10 | 10 | 10 | 10 |
| Lengths L4 and L5 of outboard crown closed grooves and outboard shoulder closed grooves (mm) | 30 | 30 | 30 | 30 | 30 | 30 | 30 | 30 | 30 |
| Lengths L6 of inboard shoulder closed grooves (mm) | 10 | 10 | 10 | 10 | 10 | 10 | 10 | 10 | 10 |
| Lap time on dry road surface (index number) | 99 | 97 | 95 | 97 | 98 | 98 | 97 | 97 | 98 |
| Generating speed of hydroplaning phenomenon (index number) | 100 | 104 | 104 | 103 | 102 | 106 | 105 | 102 | 101 |
| Uneven wear resistance (index number) | 100 | 101 | 100 | 99 | 99 | 102 | 101 | 98 | 97 |

|  | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Views showing tread pattern | FIG. 1 | FIG. 1 | FIG. 1 | FIG. 1 | FIG. 1 | FIG. 1 | FIG. 1 | FIG. 1 | FIG. 1 |
| Distance L1 of first main groove/ tread half width TWh (%) | 10.6 | 10.6 | 10.6 | 10.6 | 10.6 | 10.6 | 10.6 | 10.6 | 10.6 |
| Distance L2 of second main groove/ tread half width TWh (%) | 49.1 | 49.1 | 49.1 | 49.1 | 49.1 | 49.1 | 49.1 | 49.1 | 49.1 |
| Distance L3 of third main groove/ tread half width TWh (%) | 43.0 | 43.0 | 43.0 | 43.0 | 43.0 | 43.0 | 43.0 | 43.0 | 43.0 |
| Angles $\theta 1$ and $\theta 2$ between groove walls of first main groove and second main groove (degree) | 60 | 60 | 60 | 60 | 60 | 60 | 60 | 60 | 60 |
| Angle $\theta 3$ between groove walls of third main groove (degree) | 0 | 15 | 35 | 45 | 10 | 10 | 10 | 10 | 10 |
| Lengths L4 and L5 of outboard crown closed grooves and outboard shoulder closed grooves (mm) | 30 | 30 | 30 | 30 | 20 | 25 | 35 | 40 | 30 |
| Lengths L6 of inboard shoulder closed grooves (mm) | 10 | 10 | 10 | 10 | 10 | 10 | 10 | 10 | 5 |
| Lap time on dry road surface (index number) | 97 | 96 | 96 | 97 | 94 | 95 | 96 | 98 | 95 |
| Generating speed of hydroplaning phenomenon (index number) | 105 | 104 | 103 | 102 | 103 | 104 | 105 | 105 | 105 |
| Uneven wear resistance (index number) | 102 | 100 | 99 | 99 | 99 | 100 | 100 | 101 | 102 |

|  | Ex. 27 | Ex. 28 | Ex. 29 | Ex. 30 | Ex. 31 | Ex. 32 |
|---|---|---|---|---|---|---|
| Views showing tread pattern | FIG. 1 | FIG. 1 | FIG. 1 | FIG. 6 | FIG. 6 | FIG. 6 |
| Distance L1 of first main groove/ tread half width TWh (%) | 10.6 | 10.6 | 10.6 | 10.6 | 10.6 | 10.6 |
| Distance L2 of second main groove/ tread half width TWh (%) | 49.1 | 49.1 | 49.1 | 49.1 | 49.1 | 49.1 |

TABLE 1-continued

| | | | | | | |
|---|---|---|---|---|---|---|
| Distance L3 of third main groove/tread half width TWh (%) | 43.0 | 43.0 | 43.0 | 43.0 | 43.0 | 43.0 |
| Angles θ1 and θ2 between groove walls of first main groove and second main groove (degree) | 60 | 60 | 60 | 60 | 60 | 60 |
| Angle θ3 between groove walls of third main groove (degree) | 10 | 10 | 10 | 10 | 10 | 10 |
| Lengths L4 and L5 of outboard crown closed grooves and outboard shoulder closed grooves (mm) | 30 | 30 | 30 | 30 | 20 | 30 |
| Lengths L6 of inboard shoulder closed grooves (mm) | 15 | 20 | 25 | 10 | 10 | 20 |
| Lap time on dry road surface (index number) | 95 | 96 | 98 | 96 | 95 | 97 |
| Generating speed of hydroplaning phenomenon (index number) | 104 | 104 | 105 | 105 | 104 | 105 |
| Uneven wear resistance (index number) | 100 | 100 | 100 | 100 | 99 | 100 |

As a result of the tests, it was confirmed that the tire according to the example achieves the excellent wet performance while maintaining the dry grip performance and the uneven wear resistance.

What is claimed is:

1. A tire comprising:

a tread portion having a designated installing direction to a vehicle, the tread portion comprising an outboard tread edge to be positioned in an outboard of a vehicle when being installed to the vehicle, an inboard tread edge to be positioned in an inboard of a vehicle when being installed to the vehicle, first to third main grooves continuously extending in a tire circumferential direction and land portions divided by the first to third main grooves;

the first main groove having a groove centerline being arranged on a side of the inboard tread edge with respect to a tire equator, the groove centerline being located at a distance L1 in a tire axial direction from the tire equator in a range of from 5% to 25% of a tread half width;

the second main groove being arranged between the first main groove and the inboard tread edge, the second main groove having a groove centerline located at a distance L2 in the tire axial direction from the tire equator in a range of from 35% to 65% of the tread half width;

the third main groove being arranged between the tire equator and the outboard tread edge, the third main groove having a groove centerline located at a distance L3 in the tire axial direction from the tire equator in a range of from 25% to 55% of the tread half width, a groove width of the third main groove being smaller than groove widths of the first main groove and the second main groove; and the land portions comprising an inboard crown land portion defined between the first main groove and the second main groove, which is a plain rib that is not provided with any grooves and closed grooves, an outboard crown land portion defined between the first main groove and the third main groove, and having a width in the tire axial direction greater than that of the inboard crown land portion, an inboard shoulder land portion defined between the second main groove and the inboard tread edge and an outboard shoulder land portion defined between the third main groove and the outboard tread edge;

wherein each of the outboard crown land portion, the inboard shoulder land portion and the outboard shoulder land portion is provided with closed grooves closed in each of the outboard crown land portion, the inboard shoulder land portion and the outboard shoulder land portion, in a cross-sectional view of each of the first to third main grooves, the first to third main grooves each have a pair of groove walls extending radially outwardly linearly from a groove bottom, and an angle θ3 between the pair of groove walls of the third main groove is smaller than an angle θ1 between the pair of groove walls of the first main groove and an angle θ2 between the pair of groove walls of the second main groove.

2. The tire according to claim 1, wherein the closed grooves comprise deep closed grooves and shallow closed grooves which are different in their depth from each other.

3. The tire according to claim 2, wherein the deep closed grooves and the shallow closed grooves are arranged alternately in the tire circumferential direction in at least one of the outboard crown land portion, the inboard shoulder land portion and the outboard shoulder land portion.

4. The tire according to claim 1, wherein each of the closed grooves are long from side to side in the tire axial direction, and an angle of a longitudinal direction of each of the closed grooves and the tire axial direction is in a range of from 0 to 20 degrees.

5. The tire according to claim 1, wherein the closed grooves comprise an inboard shoulder closed groove provided on the inboard shoulder land portion, an outboard shoulder closed groove provided on the outboard shoulder land portion and an outboard crown closed groove provided on the outboard crown land portion, and in the tire axial direction, the inboard shoulder closed groove has a length smaller than those of the outboard shoulder closed groove and the outboard crown closed groove.

6. The tire according to claim 5, wherein each of the inboard shoulder closed groove, the outboard shoulder closed groove and the inside crown closed groove has a length in the tire axial direction in a range of from 10 to 30 mm.

7. The tire according to claim 1, wherein the angle θ1 between the pair of groove walls of the first main groove, and the angle θ2 between the pair of groove walls of the second main groove are in a range of from 45 to 75 degrees.

8. The tire according to claim 7, wherein
the angle θ3 between the pair of groove walls of the third main groove is in a range of from 0 to 45 degrees,
a difference between the angle θ1 and the angle θ3 is in a range of from 15 to 65 degrees, and
a difference between the angle θ2 and the angle θ3 is in a range of from 15 to 65 degrees.

9. The tire according to claim 1, wherein
at least one of the outboard crown land portion and the inboard shoulder land portion is provided with lateral grooves, and
each of the lateral grooves has one end connected to one of the main grooves and the other end without being connected to the main grooves.

10. The tire according to claim 9, wherein the closed grooves and the lateral grooves are arranged alternately in the tire circumferential direction.

11. The tire according to claim 9, wherein the lateral grooves have depths smaller than that of the closed grooves.

12. The tire according to claim 1, wherein in the outboard shoulder land portion, a shortest distance S4 from an axially outer edge of the third main groove to an axially innermost edge of each closed groove is in a range of from 0.75 to 0.85 times a groove width W1 of the first main groove.

13. The tire according to claim 12, wherein
in the outboard shoulder land portion, a shortest distance S5 from the outboard tread edge to an axially outermost edge of each closed groove is greater than the shortest distance S4, and
the shortest distance S5 is in a range of from 1.35 to 1.40 times a length L5 of each closed groove provided on the outboard shoulder land portion.

14. The tire according to claim 1, wherein
the closed grooves extend in parallel with the tire axial direction, and
the closed grooves provided on the outboard shoulder land portion are arranged in such a manner as to be aligned with the respective closed grooves provided on the outboard crown land portion completely in the tire axial direction.

15. The tire according to claim 14, wherein the closed grooves provided on the inboard shoulder land portion are arranged in such a manner as to be aligned with the respective closed grooves provided on the outboard crown land portion completely in the tire axial direction.

16. A tire comprising:
a tread portion having a designated installing direction to a vehicle, the tread portion comprising an outboard tread edge to be positioned in an outboard of a vehicle when being installed to the vehicle, an inboard tread edge to be positioned in an inboard of a vehicle when being installed to the vehicle, first to third main grooves continuously extending in a tire circumferential direction and land portions divided by the first to third main grooves;
the first main groove having a groove centerline being arranged on a side of the inboard tread edge with respect to a tire equator, the groove centerline being located at a distance L1 in a tire axial direction from the tire equator in a range of from 5% to 25% of a tread half width;
the second main groove being arranged between the first main groove and the inboard tread edge, the second main groove having a groove centerline located at a distance L2 in the tire axial direction from the tire equator in a range of from 35% to 65% of the tread half width;
the third main groove being arranged between the tire equator and the outboard tread edge, the third main groove having a groove centerline located at a distance L3 in the tire axial direction from the tire equator in a range of from 25% to 55% of the tread half width, a groove width of the third main groove being smaller than groove widths of the first main groove and the second main groove; and
the land portions comprising
an inboard crown land portion defined between the first main groove and the second main groove,
an outboard crown land portion defined between the first main groove and the third main groove, and having a width in the tire axial direction greater than that of the inboard crown land portion,
an inboard shoulder land portion defined between the second main groove and the inboard tread edge and
an outboard shoulder land portion defined between the third main groove and the outboard tread edge;
wherein
each of the outboard crown land portion, the inboard shoulder land portion and the outboard shoulder land portion is provided with closed grooves closed in each of the outboard crown land portion, the inboard shoulder land portion and the outboard shoulder land portion,
in a cross-sectional view of each of the first to third main grooves, the first to third main grooves each have a pair of groove walls extending radially outwardly linearly from a groove bottom,
an angle θ3 between the pair of groove walls of the third main groove is smaller than an angle θ1 between the pair of groove walls of the first main groove and an angle θ2 between the pair of groove walls of the second main groove,
in the outboard shoulder land portion, a shortest distance S4 from an axially outer edge of the third main groove to an axially innermost edge of each closed groove is in a range of from 0.75 to 0.85 times a groove width W1 of the first main groove,
in the outboard shoulder land portion, a shortest distance S5 from the outboard tread edge to an axially outermost edge of each closed groove is greater than the shortest distance S4, in the inboard shoulder land portion, a shortest distance S7 from an axially outer edge of the second main groove to an axially innermost edge of each closed groove is smaller than the shortest distance S4, and
the shortest distance S5 is in a range of from 1.35 to 1.40 times a length L5 of each closed groove provided on the outboard shoulder land portion.

17. The tire according to claim 16, wherein the shortest distance S7 is in a range of from 0.50 to 0.65 times the shortest distance S4.

18. The tire according to claim 17, wherein
in the inboard shoulder land portion, a shortest distance S8 from the inboard tread edge to an axially outermost edge of each closed groove is greater than the shortest distance S7, and
the shortest distance S8 is in a range of from 2.0 to 2.5 times a length L6 of each closed groove provided on the inboard shoulder land portion.

19. The tire according to claim 18, wherein the shortest distance S8 is the same as the shortest distance S5.

* * * * *